June 1, 1965 T. E. LOHR ETAL 3,186,760
COMBINATION SEAT BELT ANCHORING AND SEAT BRAKING MECHANISM
Filed May 24, 1963 2 Sheets-Sheet 1
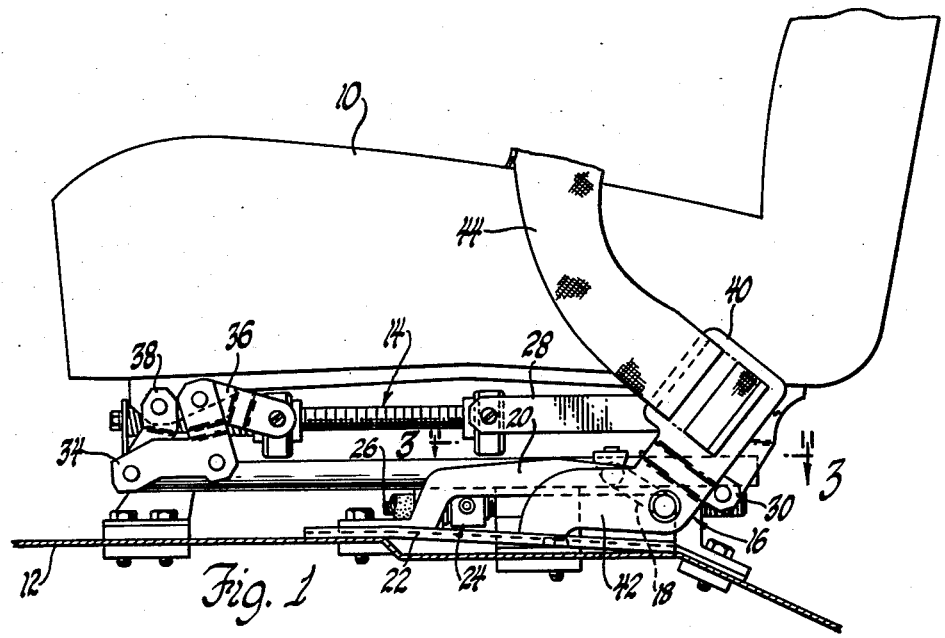
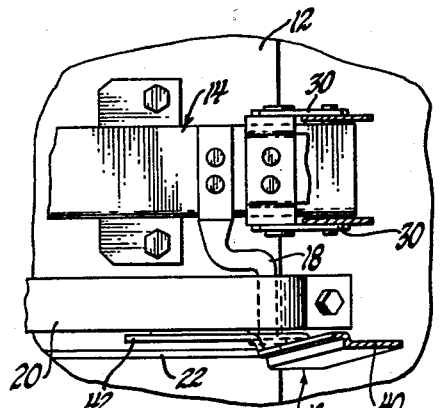
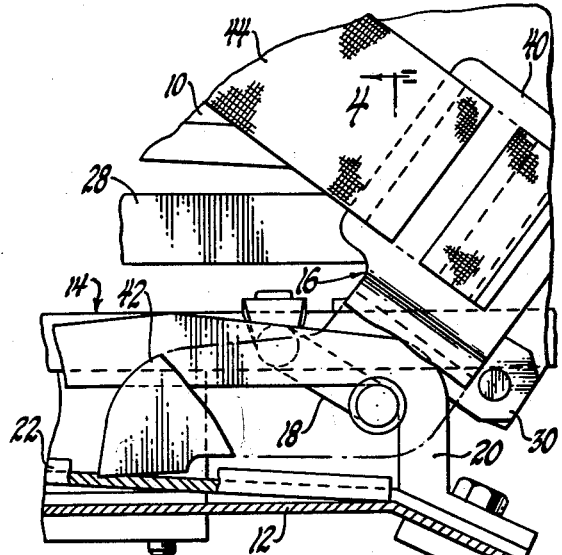
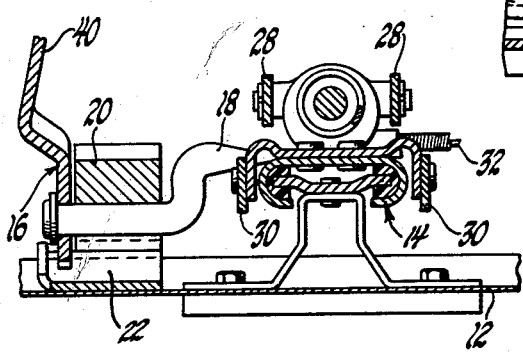
INVENTORS
Thomas E. Lohr, &
BY Romeo O. Umanos
Paul J. Ethington
ATTORNEY

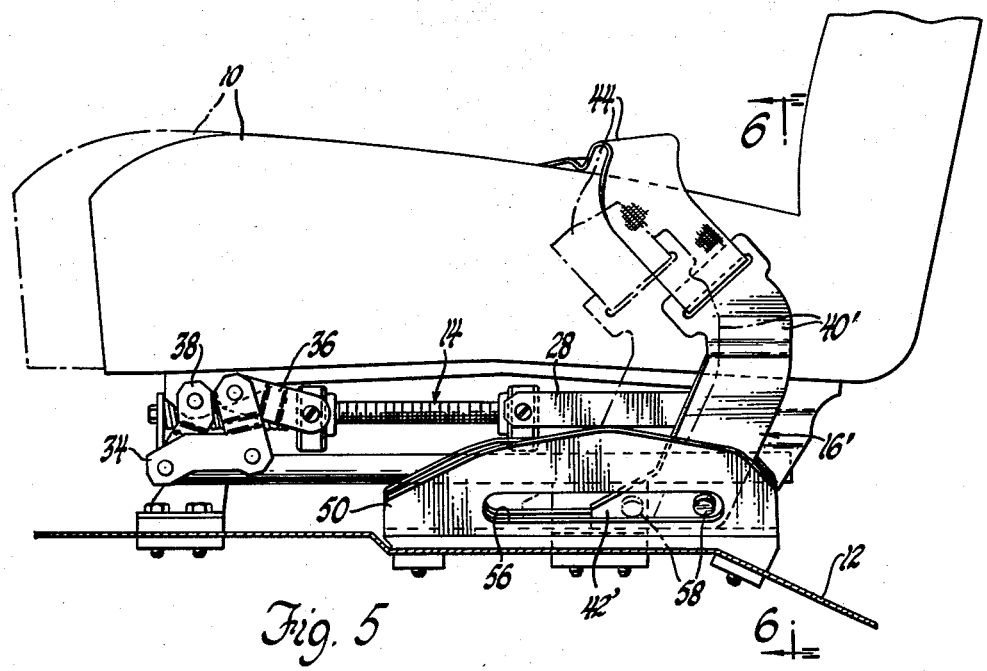
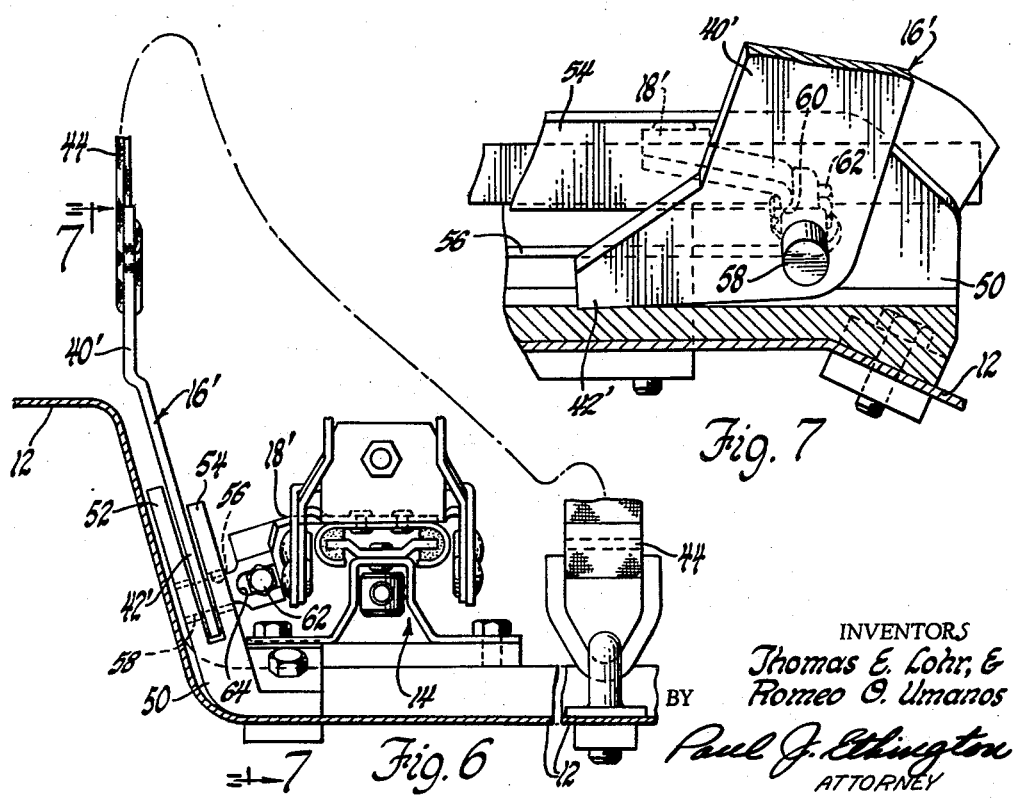

United States Patent Office 3,186,760
Patented June 1, 1965

3,186,760
COMBINATION SEAT BELT ANCHORING AND SEAT BRAKING MECHANISM
Thomas E. Lohr, Detroit, and Romeo Oribello Umanos, Livonia, Mich., assignors to General Motors Corporation, Detroit, Mich., a corporation of Delaware
Filed May 24, 1963, Ser. No. 282,924
8 Claims. (Cl. 297—216)

This invention relates to safety devices and more particularly to a device for providing both anchoring means for motor vehicle seat belts and braking means for the vehicle seat during a collision.

Seat belts have been proven an effective means for decreasing the possibility of injury to occupants during motor vehicle accidents. During a collision, a tremendous force is exerted upon the seat belt so it is imperative that the seat belt be anchored in such a manner as to withstand these forces. In the past each half of the seat belt was anchored by means such as the conventional eyebolt which is secured to the vehicle frame usually in the rear floor area. This arrangement has not proven entirely satisfactory inasmuch as it creates an unsightly appearance and is a continual annoyance to rear seat occupants particularly upon entering and leaving the vehicle. Furthermore, with the seat belt directly attached to the frame any adjustment of the seat by the vehicle occupant causes the belt to either be tensioned or relaxed and in either case requires adjustment by the occupant.

One object of the present invention is to anchor the seat belt such that adjustment of the seat by the occupant will have little or no effect on the position of the seat belt with respect to the occupant. This is accomplished by connecting the seat belt to the seat adjuster so that the seat belt remains relatively fixed with respect to the seat during seat adjustment.

While much attention has been directed to the safety features associated with the use of seat belts and rightly so, little or no attention has been given to the dangerous condition arising during a collision in which failure of the seat adjuster allows the seat to be thrown forward. During a head-on collision, the seat represents a tremendous force in the forward direction. Even under the most favorable conditions, the occupant is subjected to the additional force of the seat which may not only cause extreme injury to the occupant who is held substantially stationary by the seat belt but also represents an additional force which may cause breaking of the seat belt itself.

It is another object of this invention to provide a seat belt anchoring device which under normal driving conditions is movable with the seat but under collision conditions operates as a brake to lock the seat in its pre-collision position. This is accomplished in the present invention by connecting the seat belt to a bell crank which is pivotally connected to the seat adjuster. Under normal conditions, the bell crank and the seat belt are free to move during adjustment of the seat position. Under collision conditions, however, the bell crank is pivoted into frictional engagement with the frame to prevent movement of the seat. A more complete understanding of the invention may be had from the drawings wherein like numerals refer to like parts and wherein:

FIGURE 1 shows the seat belt anchoring means connected to the left front seat adjuster of a motor vehicle;

FIGURE 2 shows a portion of FIGURE 1 enlarged with parts broken away showing the seat belt holder position during collision conditions;

FIGURE 3 is a section taken on a plane indicated by the line 3—3 of FIGURE 1;

FIGURE 4 is a section taken on a plane indicated by the line 4—4 of FIGURE 2;

FIGURE 5 is a view similar to FIGURE 1 showing a second embodiment of the present invention;

FIGURE 6 is a section taken on a plane indicated by the line 6—6 of FIGURE 5;

FIGURE 7 is a section taken on a plane indicated by the line 7—7 of FIGURE 6 and showing the seat belt holder position during collision conditions.

Referring now to the drawings and initially to FIGURES 1–4 wherein the preferred embodiment of the invention is shown, the front seat 10 of a motor vehicle is mounted on the floor 12 by a seat adjuster generally designated 14. Only the left seat adjuster is shown in the drawings. A seat belt holder or bell crank 16 is pivotally connected to the seat adjuster 14 by means of a support arm 18 which is secured to the seat adjuster 14 by suitable means. A bridging member 20 is secured to the floor 12 and surrounds the support arm 18. Interposed between the floor 12 and the bridging member 20 is a reinforcing plate 22.

The seat adjuster 14 as best shown in FIGURES 1 and 4 is of the motor driven type being powered in the usual manner by reversible electric motors which are secured to the underside of the seat 10 and which are controlled by the driver through appropriate switches. It should be understood, however, that the seat adjuster 14 need not necessarily be of the power driven type. The invention may be practiced equally as well with the more conventional manual seat adjuster.

The seat adjuster 14 is operative to adjust the seat in the fore and aft direction in accordance with the rotation of a horizontal drive motor (not shown) which drives the horizontal adjusting mechanism 24 through a flexible cable 26. A vertical drive motor (not shown) drives the rear elevating linkages 28 and 30 through a flexible cable 32 to raise or lower the rear portion of the seat. Similarly, a second vertical drive motor (not shown) drives the front elevating linkages 34, 36, and 38 to raise or lower the forward portion of the seat. A more detailed description of the seat adjuster structure shown in the drawings may be found in the patent to Tanaka et al. 2,949,229.

The bell crank 16 has an upper portion 40 and a lower or braking portion 42 and is pivotally mounted at an intermediate portion thereof on one end of a generally S-shaped support arm 18. The other end of the support arm 18 is fixedly attached to the seat adjuster 14.

The generally U-shaped bridging member 20 is secured to the floor 12 by any suitable means and surrounds or encloses the support arm 18. The bridging member 20 allows freedom of movement of the support arm 18 in the fore and aft direction within the limitations of the fore and aft adjustment of the seat adjuster 14 but prevents movement of the support arm in the vertical direction.

The reinforcing plate 22 is interposed between the bridging member 20 and the floor 12 and provides a braking surface for the lower portion of the bell crank 16. The reinforcing plate 22 may extend across the width of the floor 12 or may be attached to the floor 12 only in that portion which is beneath the bell crank 16. Certain vehicle floor structures may render the reinforcing plate 22 unnecessary if the contour of the floor pan is satisfactory.

The upper portion 40 of the bell crank 16 is adapted to secure one end of a seat belt 44. The other end of the seat belt 44 may include a buckle (not shown) and may be anchored in the same way or to the frame in the conventional manner.

Under normal operating conditions, the support arm 18 will move within the bridging member 20 and with the seat adjuster 14 during fore and aft adjustments of the seat 10. The bell crank 16 will, of course, move with the support arm 18 but without pivoting about support arm 18. The seat belt 44 will therefore maintain its position relative to the seat 10 regardless of the horizontal adjustment of the seat and the occupant is not subjected to the objectionable change in belt tension during fore and aft seat adjustment. While adjustment of the seat in the vertical direction would appear to change the belt tension, this change in tension is negligible since adjustment of the seat in the vertical direction is restricted to approximately one inch.

Under collision or sudden stop conditions, when the passenger is subjected to forces tending to urge him forwardly out of the seat 10, the bell crank 16 will pivot about the support arm 18 due to the forward movement of the seat belt 44 causing the lower or braking portion 42 or bell crank 16 to be driven into engagement with the reinforcing plate 22 as best shown in FIGURE 2. The support arm 18 is prevented from moving in the vertical direction by the bridging member 20. The seat 10 is therefore effectively grounded to the floor and is prevented from horizontal or vertical movement even though forces acting on the belt 44 and the seat 10 would under normal conditions cause the seat adjusted to fail.

Referring now to FIGURES 5, 6, and 7 there is shown another embodiment of the present invention. As in the previous embodiment, the front seat 10 of the motor vehicle is mounted on the floor 12 by a seat adjuster 14. The seat adjuster 14 is identical with that shown in FIGURES 1–4.

A guide member 50 having upstanding side walls 52 and 54 is secured to the floor 12. Side walls 52 and 54 have an elongated slot 56 formed therein.

A bell crank 16' having an upper portion 40' and a lower portion 42' is pivotally mounted at an intermediate portion thereof on a pivot pin 58 which extends through the slot 56. The lower portion 42' of the bell crank 16' is received between the upstanding side walls 52 and 54 of the guide member 50. A generally L-shaped support arm 18' is fixedly mounted at one end thereof by suitable means to the seat adjuster 14. The other end of the support member 18' sets in a generally V-shaped slot 60 in the pivot pin 58 and is secured thereto by suitable means such as the bolt 62. The pivot pin 58 is slotted as at 64 to facilitate axial adjustment of the support arm 18'.

The operation of this embodiment of the invention is similar to that described above in connection with the preferred embodiment. Under normal operating conditions the support arm 18', pivot pin 58, and the bell crank 16' are free to move in the fore and aft direction during horizontal adjustment of the seat 10. Under collision or sudden stop conditions, however, the bell crank 16' will pivot about the pivot pin 58 causing the lower or braking portion 42' of the bell crank 16' to be driven into braking engagement with the guide member 50 as best shown in FIGURE 7. The pivot pin 58 by engaging the longitudinal slot 56 in the guide member 50 will prevent the bell crank 16 from moving in the vertical direction. The seat 10 is therefore effectively grounded to the floor and is prevented from moving in either the horizontal or vertical directions.

It is apparent from the above description that the present invention provides a device for anchoring motor vehicle seat belts in such a manner as to eliminate the objectionable tensioning and relaxing of the belt during seat adjustment and further and more importantly from a safety standpoint provides a mechanism which positively locks the seat to the motor vehicle frame during collision or sudden stop conditions thereby preventing possible failure of the seat adjuster due to forces acting on the seat.

Since changes may be made in the above-described arrangement and different embodiments may be devised by those skilled in the art without departing from the spirit and scope of the invention, it is to be understood that the matter contained in the foregoing description and accompanying drawings is illustrative of the application of the principles of the invention and is not to be construed in a limiting sense.

We claim:

1. Apparatus for anchoring a seat belt in a motor vehicle having a seat of the type that is movably mounted on the vehicle floor, said apparatus comprising means connecting an end of said seat belt to said seat so as to permit movement therewith, the connecting means including belt holder means pivotally supported on said seat and having one end joined to said seat belt and the other end provided with a braking portion positioned adjacent said floor so that when said seat belt is subjected to a predetermined tensioning force said belt holder will pivot and the braking portion thereof will brakingly engage said floor thereby preventing movement of said seat.

2. Apparatus for anchoring a seat belt in a motor vehicle having a seat of the type that is movably mounted on the vehicle floor, said apparatus comprising means connecting an end of said seat belt to the seat so as to permit movement therewith, the connecting means including a belt holder pivotally supported on said seat and having one end joined to said seat belt and the other end provided with a braking portion positioned adjacent said floor so that when said seat belt is subjected to a predetermined tensioning force said seat belt holder will pivot and the braking portion thereof will brakingly engage said floor thereby resisting the force, and means resisting movement of said belt holder away from said floor so as to supplement the resistance afforded by the anchoring of the seat to the floor.

3. In a motor vehicle having a seat mounted on seat adjusting means connected to the vehicle frame, a combination seat belt anchoring and seat braking mechanism comprising a seat belt holder having a seat belt secured to a portion thereof, a support arm fixedly attached to said seat adjusting means, said holder being pivotally connected to said support arm, additional means secured to the floor of said motor vehicle for restraining movement of said bar in a direction generally perpendicular to said floor, said holder being pivoted about said support arm and driven into engagement with said floor and said bar being driven into engagement with said additional means upon the application of a predetermined tensioning force to said seat belt whereby said seat is prevented from moving in the horizontal or vertical direction.

4. A combination seat belt anchoring and seat braking mechanism for a seat of the type that is movably mounted on a seat adjuster secured to the floor of a motor vehicle, said vehicle including a seat belt assembly having a pair of belt portions adapted to extend across said seat, said mechanism comprising a seat belt holder, one of said belt portions being connected to said holder, means connecting the other of said belt portions to said vehicle frame support means connected to said seat adjuster and pivotally mounting said holder whereby the position of said seat belt assembly relative to said seat is unaffected by adjustment of said seat, said holder pivoting about said support means and brakingly engaging said floor when said seat belt is subjected to a tensioning force whereby said seat is prevented from moving in a horizontal direction, and additional means connected to said frame and bridging said support means to prevent movement of said seat in a vertical direction upon the application of said force to said seat belt.

5. In a motor vehicle having a seat mounted on seat adjusting means connected to the vehicle frame, a combination seat belt anchoring and seat braking mechanism comprising a bell crank, a seat belt connected to one end of said bell crank, the other end of said bell crank provided with a braking portion positioned adjacent the floor, a first member fixedly attached to said seat adjusting means and movable therewith, said bell crank being pivotally supported on said first member, a second member secured to the floor of said motor vehicle and bridging said first member, said floor including a reinforced area adjacent said braking portion, said braking portion normally slidably engaging said reinforced area of said floor, during adjustment of said seat, said braking portion frictionally engaging said reinforced area of said floor and said first member engaging said second member upon the application of a tensioning force to said seat belt thereby preventing horizontal or vertical movement of said seat.

6. In a motor vehicle having a seat mounted on seat adjusting means connected to the vehicle frame, a combination seat belt anchoring and seat braking mechanism comprising a bell crank, a seat belt connected to one end of said bell crank, a support arm fixedly mounted on said seat adjusting means and movable therewith, a guide member having upstanding side walls and mounted on said walls having an elongated slot formed therein, a pin extending through said slot and pivotally supporting said bell crank between said side walls, said pin being connected to said support arm, the other end of said bell crank normally slidably engaging said guide member during adjustment of said seat, said bell crank pivoting about said pin with said lower portion frictionally engaging said guide member thereby locking said seat to said floor upon the application of a tensioning force to said seat belt.

7. The combination of a motor vehicle seat adjuster, said adjuster supporting a seat and being connected to the floor of the motor vehicle, a seat belt assembly including a pair of belt portions adapted to extend across said seat, seat belt anchoring means comprising a bell crank, one of said seat belt portions being connected to one end of said bell crank, the other of said seat belt portions being connected to the floor of the motor vehicle, the other end of said bell crank provided with a braking portion, a support member having one end thereof fixedly attached to said seat adjuster, a guide member having upstanding side walls and mounted on said floor, said walls having an elongated slot formed therein, a pin extending through said slot and pivotally supporting said bell crank between said side walls, said pin being connected to said support member, said bell crank pivoting about said pin with said braking portion frictionally engaging said guide member upon the application of a tensioning force to said seat belt thereby locking said seat to said floor.

8. The combination of a motor vehicle seat adjuster, said seat adjuster supporting a seat and being connected to the floor of the motor vehicle, a motor vehicle seat belt assembly comprising a pair of belt portions adapted to extend over said seat, seat belt anchoring means comprising a bell crank, one of said seat belt portions being connected to one end of said bell crank, the other end of said bell crank provided with a braking portion positioned adjacent said floor, the other of said seat belt portions being connected to said floor, a support arm of substantially S-shape having one end fixedly attached to said seat adjuster and movable therewith, said bell crank being pivotally connected to the other end of said support arm, a bridging member of substantially U-shape secured to the floor of said motor vehicle and surrounding said S-shaped member, a reinforcing member interposed between said U-shaped member and said floor whereby upon the application of a tensioning force to said seat belt said crank will pivot about said S-shaped member and said braking portion of said bell crank will brakingly engage said reinforcing member and said S-shaped member will abut said U-shaped member to prevent movement of said seat.

References Cited by the Examiner
UNITED STATES PATENTS

| | | | |
|---|---|---|---|
| 2,117,932 | 5/38 | Anker | 297—216 |
| 2,277,947 | 3/42 | Bailey | 248—429 |
| 2,705,529 | 4/55 | Bull et al. | 297—386 |
| 2,947,353 | 8/60 | Von Wimmersperg | 280—150 |
| 2,990,009 | 6/61 | Moeller | 297—385 |
| 3,100,669 | 8/63 | Monroe | 297—388 |

FRANK B. SHERRY, *Primary Examiner.*

UNITED STATES PATENT OFFICE
CERTIFICATE OF CORRECTION

Patent No. 3,186,760                                                         June 1, 196

Thomas E. Lohr et al.

It is hereby certified that error appears in the above numbered patent requiring correction and that the said Letters Patent should read as corrected below.

Column 3, line 21, for "adjusted" read -- adjuster --; column 5, line 16, after "said" insert -- floor, said --; colum 6, line 23, after "said", second occurrence, insert -- bell --.

Signed and sealed this 21st day of December 1965.

(SEAL)
Attest:

ERNEST W. SWIDER                                    EDWARD J. BRENNER
Attesting Officer                                         Commissioner of Patents